UNITED STATES PATENT OFFICE.

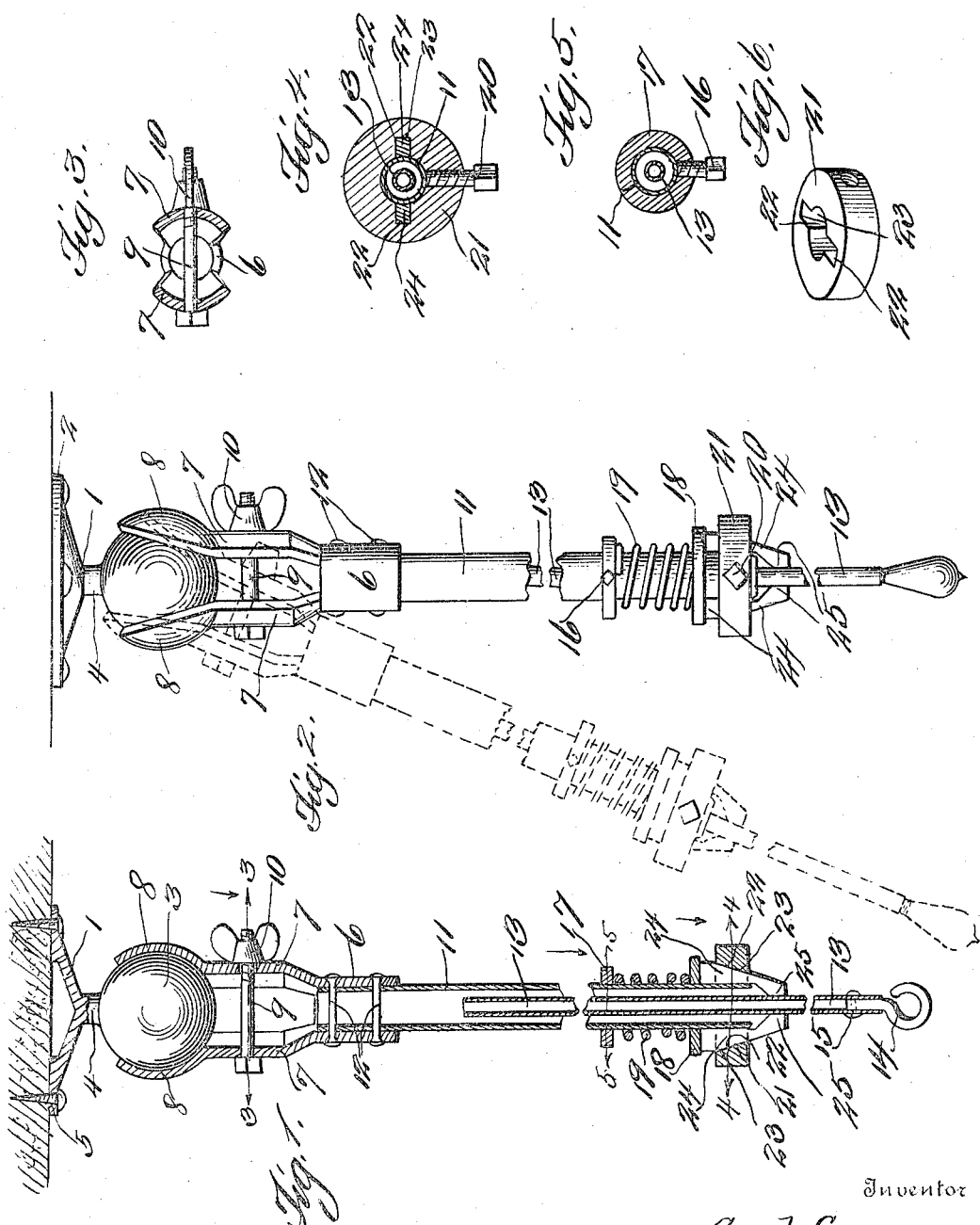

CARL SORENSEN, OF RACINE, WISCONSIN.

HANGER FOR SUPPORTING INCANDESCENT LAMPS.

1,036,739. Specification of Letters Patent. Patented Aug. 27, 1912.

Application filed January 17, 1912. Serial No. 671,720.

*To all whom it may concern:*

Be it known that I, CARL SORENSEN, a citizen of the United States, residing at Racine, in the county of Racine and State of Wisconsin, have invented a new and useful Hanger for Supporting Incandescent Lamps; and I do hereby declare the following to be a full, clear, and exact description of the invention, such as will enable others skilled in the art to which it appertains to make and use the same.

This invention relates to a new and useful hanger or support for incandescent lamps, &c., of such a design as to permit the lamp to be moved universally, and up and down.

One of the features of the invention is the fact that when the lamp is moved, the same is held in the desired position frictionally.

The invention comprises further features and combination of parts, as hereinafter set forth, shown in the drawings and claimed.

In the drawings:—Figure 1. is a vertical sectional view through the hanger, the same being constructed in accordance with the invention. Fig. 2 is a similar view showing the lamp supported by the hanger as being raised, and also showing the hanger as disposed in different positions in dotted lines. Fig. 3 is a sectional view on line 3—3 of Fig. 1. Fig. 4 is a sectional view on line 4—4 of Fig. 1. Fig. 5 is a sectional view on line 5—5 of Fig. 1. Figs. 6 and 7 are detail views.

Referring to the drawings, 1 designates a bracket, in the form of a casting, which terminates at its upper end in an annular plate 2, and at its lower portions in a spherical bearing member or ball 3, there being a narrow neck 4 adjoining the two. This annular plate 2 is provided with a series of apertures 5, through which screws or the like penetrate for securing the casting to the ceiling.

A sleeve 6 having the resilient spring arms 7 is provided. These arms 7 terminate at their upper ends in spherical cup shape members 8, which are adapted to fit the spherical bearing member 3 as shown in Figs. 1 and 2. Extending through the spring arm is a bolt 9, on the threaded end of which the wing nut 10 is mounted. By adjusting the nut 10, the cup shape members 8 may be brought closer in contact with the spherical bearing member 3, thus holding the hanger in various adjusted positions.

Secured in the sleeve 6 is a tube 11, by means of the rivets or bolts 12. Received telescopically by the tube 11 is an additional tube 13, in the lower end of which a hook 14 is secured by the rivet or bolt 15. This hook 14 is designed for the purpose of holding the cord of the incandescent lamp, as shown in the drawings, references being had to Fig. 1. The hook 14 may be dispensed with if desired, and the incandescent lamp screwed into the lower end of the tube 13 as shown in Fig. 2. Secured on the tube 11, by means of the said screw 16, is a collar 17, between which and the collar 18 a coil spring 19 is interposed. The collar 18 is loosely mounted on the tube 11. Secured on the lower end of the tube 11 by a set screw 20 is another collar 21 having recesses 22, which are arranged oppositely. The inner walls 23 of the recesses 22 are inclined downwardly and toward one another. Disposed in the recesses 22 are the jaws 24, the feet 25 of which are designed to frictionally engage the inner tube 13, so as to hold the same in any desired position, when adjusted vertically. The outer walls of the jaws are inclined correspondingly with the walls 23, and by this structure the lower ends or feet of the jaws are thrown toward one another in contact with the tube 13, by the action of the spring 19, which bears against the collar or washer 18.

From the foregoing it will be observed that there has been devised, a simple, novel and efficient hanger, that may be moved universally by the provision of a spherical bearing member having the cup shape members to engage therewith, and one that may be moved or adjusted vertically.

The invention having been set forth, what is claimed as new and useful is:—

1. In combination, a tubular rod having a universal connection adapted to be secured to a ceiling, a second tube or rod arranged telescopically in the first tube, a collar having oppositely arranged recesses with inclined inner walls, means for securing said collar on the extreme lower portion of the first tube, a pair of jaws having outer faces, inclined correspondingly to the inclination of the walls of the recesses, said jaws being received in the recesses and provided with feet extending beyond the first two recesses and adapted to bear frictionally against the second tube, so as to hold the second tube in adjusted position, a washer resting on the upper ends of the jaw, a second washer spaced apart from the first washer, and means interposed between the washers, thus forcing the jaws downwardly to cause the feet to engage the second tube.

2. In combination, a spherical bearing member adapted to be fastened to the ceiling, a sleeve having spring arms terminating at their upper ends in cup shape members to engage the spherical member, means carried by the spring arms for bringing the cup shape members frictionally in contact with the spherical member, a tubular rod secured in the sleeve, a second tube or rod arranged telescopically in the first tube, a collar having oppositely arranged recesses with inclined inner walls, means for securing said collar on the extreme lower portion of the first tube, a pair of jaws having outer faces, inclined correspondingly to the inclination of the walls of the recesses, said jaws being received in the recesses and provided with feet extending beyond the first two recesses and adapted to bear frictionally against the second tube, so as to hold the second tube in its adjusted position, a washer resting on the upper ends of the jaw, a second washer spaced apart from the first washer, and means interposed between the washers, for forcing the jaws downwardly to cause the feet to engage the second tube.

In testimony whereof I have signed my name to this specification in the presence of two subscribing witnesses.

CARL SORENSEN.

Witnesses:
CHRISTIAN JOHNSON,
VALD JENSEN.